United States Patent Office 2,736,695
Patented Feb. 28, 1956

2,736,695

PROCESS FOR PREPARING TRICHLOROACETYL CHLORIDE

John D. Calfee, Dayton, Ohio, and Thomas A. Wallace, Jr., Carle Place, N. Y., assignors to Allied Chemical & Dye Corporation, New York, N. Y., a corporation of New York No Drawing. Application June 5, 1951,
Serial No. 230,072

4 Claims. (Cl. 204—158)

This invention relates to the preparation of trichloroacetyl chloride, and more particularly to a process carried out by the continuous vapor phase oxidation of tetrachloroethylene with an oxygen-containing gas in the presence of actinic radiation and in the absence of a catalyst.

Trichloroacetyl chloride has been prepared in the past by the liquid phase oxidation in the presence of actinic light of tetrachloroethylene (tetrachloroethene, perchloroethylene) with an oxygen-containing gas such as air in the presence or absence of chlorine as a catalyst. The above procedure is unsatisfactory in that the time required to complete the reaction is excessively long (4–12 days), especially when carried out in the absence of chlorine and if it is desired to obtain trichloroacetyl chloride free from perchloroethylene, the oxidation is continued until all of the perchloroethylene is oxidized even at the risk of diminished yields through side reactions, since trichloroacetyl chloride and tetrachloroethylene are not readily completely separable by simple distillation techniques.

It is also known that in the presence of chlorine, tetrachloroethylene will react in the vapor phase with oxygen under the influence of actinic radiation to produce trichloroacetyl chloride.

It is an object of the present invention to provide a process for obtaining high yields of trichloroacetyl chloride in a relatively short reaction period.

It is a further object of the invention to provide such a process in which the use of chlorine is dispensed with.

A still further object of the invention is to provide a continuous vapor phase process for the conversion of tetrachloroethylene to trichloroacetyl chloride.

These and other objects are accomplished according to our invention wherein tetrachloroethylene and oxygen are reacted in the vapor phase under the influence of actinic radiation.

The process according to our invention proceeds essentially as follows:

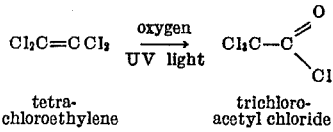

In carrying out the process of our invention, tetrachloroethylene vapor and an oxygen-containing gas such as air are mixed in the desired proportions and the mixture is exposed to actinic radiation for a time sufficient to effect the oxidation of the desired portion or substantially all of the tetrachloroethylene. The products of the reaction, usually including, besides the desired trichloroacetyl chloride, some phosgene ($COCl_2$) and some unreacted tetrachloroethylene, are recovered in any suitable manner for example by condensation at appropriate temperatures.

The process of our invention is especially adapted for continuous operation, and in carrying out the process in this manner, oxygen-containing gas and tetrachloroethylene vapor are continuously mixed and are led continuously through a zone of exposure to actinic radiation, and thence to condensing zones, where the product may be continuously withdrawn and subjected to further purification if desired.

The volume ratio of tetrachloroethylene vapor to oxygen in the mixture exposed to actinic radiation is important in determining degree of conversion of tetrachloroethylene to trichloroacetyl chloride, and hence in determining yield of resulting product. Optimum conversion of tetrachloroethylene to trichloroacetyl chloride appears to be obtained at a tetrachloroethylene vapor to oxygen volume ratio of about 1:0.8 or a tetrachloroethylene to air ratio of about 1:4. At about this ratio, using air as the oxygen-containing gas, conversion to trichloroacetyl chloride may be about 75% whereas if the air-tetrachloroethylene ratios are varied in either direction, a decrease in conversion to trichloroacetyl chloride results. Accordingly, when using air as the oxygen-containing gas, we prefer to use air-tetrachloroethylene ratios not less than about 1:1 and not more than about 6:1, preferably between about 3.5:1 and about 4:1 or, when oxygen is used, suitable ratios are not less than about 0.2:1 or more than about 1.2:1 of oxygen to tetrachloroethylene vapor by volume, preferably between about 0.7:1 and about 0.8:1.

The pressure under which the reaction is carried out is important, and pressures in excess of atmospheric appear to result in lower yields, while pressures somewhat below normal atmospheric are optimum for best yields. Accordingly, we prefer to carry out the process at atmospheric or subatmospheric pressures; preferably between about 500 mm. Hg and about 600 mm. Hg absolute.

The oxygen-containing gas may be oxygen or any mixture thereof with an inert gas such as nitrogen or the like. Air is a convenient and entirely suitable gas and, because of its availability, is preferred. As brought out above, the amounts used for best yields should be within the ratios specified above, and the oxygen-containing gas may conveniently be fed from a source of such gas under pressure, particularly when operating continuously.

The actinic radiation may be derived from any suitable source of actinic rays, preferably those in the violet and/or ultraviolet region. We have found the commonly used mercury vapor tubes suitable for the purpose.

The temperature of the reaction is not critical, to the extent that it requires no external regulation, and, after initiation of reaction, is allowed to rise as the exothermic reaction proceeds. It is important, however, that the tetrachloroethylene be in the vapor state and preferably intimately mixed with the oxygen-containing gas before exposure of the mixed vapors to the actinic radiation. Such mixing may be accomplished in any suitable manner, for example by feeding vaporous tetrachloroethylene and oxygen-containing gas to a common stream; or vaporization of tetrachloroethylene and mixing with oxygen-containing gas may readily be accomplished simultaneously by bubbling air or other oxygen-containing gas through normally liquid tetrachloroethylene (B. P. 121.2° C.) at a temperature and rate of flow such that the desired volume of tetrachloroethylene vapor is produced to yield a vapor-air mixture of the compositions described above. Thus, with the liquid tetrachloroethylene at 30–35° C. the passage of a stream of air dispersed by a porous sintered glass aerator therethrough at about 1.5 liters per minute produces a reaction mixture having the desired optimum volume ratio of 1 volume of tetrachloroethylene vapor to between about 3.5 and about 4 volumes of air. It may be advantageous in some cases to first prepare a tetrachloroethylene-oxygen-containing gas mixture having an excess of tetrachloroethylene over the optimum ratios and to bring the ratio to the desired value by feeding additional oxygen-containing gas into the vaporous tetrachloroethylene-oxygen-containing gas stream as it passes to the zone of exposure to actinic radiation.

The process may be carried out in any suitable apparatus. For continuous operation we find it advantageous to use a cylindrical reaction tube having the actinic radiation source mounted within the reaction chamber, for example an ultraviolet lamp in the form of a cylindrical tube of smaller diameter than the reaction tube, to furnish an annular reaction zone surrounding the lamp and through which zone the mixed vapors pass to react. Connected to the reaction tube is a source of mixed vapors, which may conveniently take the form of a closed chamber for liquid tetrachloroethylene provided with means for maintaining the temperature at the desired level, and means for introducing oxygen-containing gas such as air in the desired proportions, the air being introduced through a bubbler or similar device for comminuting it into small bubbles as it is introduced beneath the liquid tetrachloroethylene in the vaporizing chamber; the chamber is equipped with a take-off arm through which the mixed vapors pass to the irradiated reaction chamber, with or without the introduction of additional air into the vapor stream as desired. After passing through the irradiated reaction chamber, the gaseous reaction mixture may be conducted to a refrigerated condenser to recover liquid trichloroacetyl chloride (B. P. 118° C.). If desired, a second low temperature condenser may be provided to separate by-product phosgene (B. P. 8.3) while passing the spent oxygen-containing gas to discard or further recovery process as desired.

Since trichloroacetyl chloride and tetrachloroethylene have close boiling points, any unreacted tetrachloroethylene will be condensed along with the product trichloroacetyl chloride. These compounds are difficult to separate by fractional distillation. Accordingly, if it is desired to recover trichloroacetyl chloride uncontaminated with tetrachloroethylene, reaction conditions should be regulated, e. g. duration of exposure to actinic light, intensity of radiation, etc., to insure complete conversion of tetrachloroethylene to other reaction products.

If the trichloroacetyl chloride is to be converted into trichloroacetic acid or other derivatives, complete conversion is not necessary. When trichloroacetic acid is the desired product, trichloroacetyl chloride may be separated from water-insoluble tetrachloroethylene by drowning the condensed trichloroacetyl chloride-tetrachloroethylene mixture in water to hydrolyze the trichloroacetyl chloride to the appreciably water-soluble trichloroacetic acid, and separating the insoluble tetrachloroethylene as by decantation.

The following specific examples further illustrate our invention:

Example I

A charge of liquid tetrachloroethylene was placed in a glass vaporizer vessel equipped with tetrachloroethylene inlet, a capillary tube air inlet dipping below the level of the liquid tetrachloroethylene and having a porous sintered glass bubbler at its end, a thermometer, and a take-off arm leading to a cylindrical reaction tube 3 feet long and 3 inches outside diameter having concentrically disposed therein a standard 1" diameter mercury vapor lamp tube designed to emit light of germicidal wave length (ca 2800 A.), running the length of the tube. The temperature of the tetrachloroethylene in the vaporizer was raised to 35° C. Air was bubbled through the tetrachloroethylene in the vaporizer at about 1.5 liters per minute for 30 minutes while maintaining the temperature of the tetrachloroethylene at about 35° C. The air-tetrachloroethylene vapor mixture thus produced in which the ratio of air to tetrachloroethylene was about 3.8 to 1, was led through the reaction tube at a rate of about 1.8 liters per minute, while maintaining the pressure in the reaction tube at 560 mm. Hg absolute, the vapor mixture thus being exposed to the ultraviolet radiation for an average of about 2 minutes. A total of 84 grams of tetrachloroethylene (11.6 liters) and 44 liters of air (20° C. atmospheric pressure) was passed. After reaction, the product gases were passed successively through an ice-water trap to condense primarily trichloroacetyl chloride and unreacted tetrachloroethylene and through an ice-acetone trap to condense primarily phosgene. The uncondensed gases were then exited to waste. A total of 67 grams of trichloroacetyl chloride and 6 grams of unreacted tetrachloroethylene were recovered from the two traps corresponding to a yield of 78% of theoretical of trichloroacetyl chloride based on the tetrachloroethylene reacted or 73% based on tetrachloroethylene introduced.

Example II

This run was carried out in an apparatus similar to that described in Example I.

Liquid tetrachloroethylene was charged to the vaporizer, the temperature of the tetrachloroethylene in the vaporizer was raised to 34° C. and air was bubbled through it at the rate of one liter per minute for 26 minutes, during which time the liquid tetrachloroethylene temperature was maintained between 34° C. and 36° C. A total of 25 liters of air and 4.3 liters (32.5 grams) of tetrachloroethylene was put through at a volume ratio of tetrachloroethylene:air of 1:5.8, the vapor mixture thus being exposed to the ultraviolet radiation for an average of about 3.3 minutes. During the reaction, a slightly reduced pressure (740 to 750 mm. Hg absolute) was maintained at the exhaust end of the reaction tube. During the reaction, the tube temperature rose from 57° C. at the start of the reaction to 67° C. at the end of the reaction. After reaction, the product gases were passed through refrigerated traps as described in Example I. The resulting product recovered from both traps amounted to 23.6 grams, corresponding to a yield of 67.5% of tichloroacetylchloride.

While the above describes the preferred embodiments of our invention, it will be understood that departures may be made therefrom within the scope of the specification and claims.

We claim:

1. A process for preparing trichloroacetyl chloride, which comprises continuously mixing tetrachloroethylene vapor and air in the absence of elemental chlorine in the proportion of 1 part of tetrachloroethylene by volume to between about 1 part and about 6 parts of air, and continuously passing the resulting mixture through a zone of exposure to actinic radiation, said exposure enduring for a residence time of not more than about 3.3 minutes.

2. A process for continuously producing trichloroacetyl chloride which comprises continuously passing a mixture free from elemental chlorine and consisting essentially only of tetrachloroethylene vapor and air in the proportion by volume of 1 part of tetrachloroethylene to between about 3.5 and about 4 parts of air through a zone of exposure to actinic radiation, said exposure enduring for a residence time of not more than about 3.3 minutes, and continuously recovering the resulting trichloroacetyl chloride.

3. A process for continuously producing trichloroacetyl chloride which comprises continuously passing a mixture of tetrachloroethylene vapor and air in the absence of elemental chlorine in the proportion by volume of 1 part of tetrachloroethylene to between about 3.5 and about 4 parts of air through a zone of exposure to actinic radiation, said exposure enduring for a period of not more than about 3.3 minutes, said zone being maintained at a pressure between about 500 mm. Hg and about 600 mm. Hg absolute, and continuously recovering the resulting trichloroacetyl chloride.

4. A process for preparing trichloroacetyl chloride in high yields, which comprises continuously passing a mixture, free from elemental chlorine, of tetrachloroethylene and oxygen, in the proportion of 1 part by volume of tetrachloroethylene vapor to between about 0.2 part and about 1.2 parts of oxygen, through a zone of exposure to actinic radiation, at such a rate as to cause exposure of said mixture to said actinic radiation for a period of not more than about 3.3 minutes.

References Cited in the file of this patent

UNITED STATES PATENTS

| | | |
|---|---|---|
| 2,292,129 | Kirkbride | Aug. 4, 1942 |
| 2,321,823 | Kirkbride | June 15, 1943 |
| 2,427,624 | Rushmer et al. | Sept. 16, 1947 |

FOREIGN PATENTS

| | | |
|---|---|---|
| 363,099 | Great Britain | Dec. 17, 1931 |
| 546,561 | Great Britain | July 20, 1942 |

OTHER REFERENCES

Dickinson et al.: Journal American Chemical Society, vol. 54, (1932), pp. 3852–3862.

Dickinson et al.: Journal American Chemical Society, vol. 56, (1934), pp. 1473–1480.